United States Patent [19]

Navé

[11] Patent Number: 5,748,823
[45] Date of Patent: May 5, 1998

[54] SINGLE-TUBE PLENUM RIBBON CABLE

[75] Inventor: Samuel D. Navé, Conover, N.C.

[73] Assignee: Siecor Corporation, Hickory, N.C.

[21] Appl. No.: 792,814

[22] Filed: Jan. 30, 1997

[51] Int. Cl.$^6$ ............................................... G02B 6/44
[52] U.S. Cl. ...................... 385/113; 385/109; 385/114; 385/106; 174/121 A
[58] Field of Search ........................ 385/100–115; 174/70 R, 121 R, 121 A

[56] References Cited

U.S. PATENT DOCUMENTS

| | | | |
|---|---|---|---|
| 4,510,348 | 4/1985 | Arroyo et al. | 174/121 A |
| 4,595,793 | 6/1986 | Arroyo et al. | 174/121 A |
| 4,605,818 | 8/1986 | Arroyo et al. | 174/107 |
| 4,818,060 | 4/1989 | Arroyo | 350/96.23 |
| 4,881,794 | 11/1989 | Bartoszek | 350/96.23 |
| 4,892,382 | 1/1990 | Story et al. | 350/96.23 |
| 4,913,517 | 4/1990 | Arroyo et al. | 350/96.23 |
| 4,941,729 | 7/1990 | Hardin et al. | 350/96.23 |
| 4,969,706 | 11/1990 | Hardin et al. | 350/96.23 |
| 5,024,506 | 6/1991 | Hardin et al. | 350/96.23 |
| 5,173,960 | 12/1992 | Dickinson | 385/100 |
| 5,389,442 | 2/1995 | Arroyo et al. | 428/396 |
| 5,561,729 | 10/1996 | Parvis | 385/113 |
| 5,566,266 | 10/1996 | Navé et al. | 385/113 |

OTHER PUBLICATIONS

Applied Photonic Devices, Inc. Product Literature OPTI-Pake® LTP Universal Cable, AP117-B-1,1995. No Month.
Union Carbide Chemicals and Plastics Company Inc. Preliminary Product Information Report—Mar. 1991, Union Carbide Industrial Product, Union Carbide DEFA-1638 NT.
Owens Corning Product Information, CR 1700 Cable Reinforcement, Nov. 1994.
Siecor Recommended Procedure, SRP-004-073, Issue 2 Oct. 1996, Sheath Removal of Siecor Ribbon Riser and Ribbon Plenum Cables.

Primary Examiner—Phan T. H. Palmer

[57] ABSTRACT

An optical fiber cable suitable for use in building plenums includes a core comprising at least one optical fiber; a core tube formed of a non-halogenated polyolefin-based polymer material surrounding the core; a jacket formed of chlorinated plastic material surrounding said core tube; and a plurality of dielectric strength members which are disposed between said core tube and said jacket, said cable being capable of meeting all test criteria set out in UL Standard 910.

20 Claims, 1 Drawing Sheet

SINGLE-TUBE PLENUM RIBBON CABLE

BACKGROUND OF THE INVENTION

This invention relates to optical fiber cables which are suitable for use within buildings. In particular, this invention relates to single-tube design optical fiber ribbon cables suitable for use in building plenums.

Telephone, data, and video service within buildings is provided by riser and plenum cables and by cables which are not rated for riser or plenum use. Riser cables extend upwards from basement vaults to wiring closets located on upper floors. Plenum cables and non-rated cables typically extend horizontally from a wiring closet to other areas located on the same floor.

If fire reaches a flammable cable located in a building plenum, the cable can convey fire and smoke to other areas on the building floor. For this reason, cables in a plenum must either be located within a metal raceway or be resistant to the spreading of flame and the generation of smoke. Such metal raceways increase the cost of an installation and are somewhat difficult to install. Under the provisions of the National Electrical Code, a cable which meets appropriate standards provided by an authority such as Underwriters Laboratories (UL) may be allowed to be used in plenums without the use of a metal conduit.

Cables used in buildings may be rated as plenum cables, riser cables, or nonrated cables. The plenum rating requires the most exacting standards for flame propagation and optical smoke density properties. If a cable is approved for plenum use, it therefore meets the flame propagation and optical smoke density requirements for riser cable and non-rated cable uses. UL Standard 910, "Test for flame-Propagation and Smoke-Density Values for Electrical and Optical-Fiber Cables Used in Spaces Transporting Environmental Air," is the generally accepted standard for plenum cables. The Fourth Edition of UL Standard 910, dated Feb. 24, 1995, is referred to herein as UL Standard 910. References herein to values for the maximum flame-propagation distance and peak and average optical density are made with respect to testing as described in UL Standard 910. Cables meeting UL Standard 910, in turn, meet the test criteria set out in NFPA 262 and thus are acceptable under the National Electrical Code, and are referred to herein as being plenum-rated cables.

UL Standard 910 is a fire test for determining values of flame-propagation distance and optical smoke density for electrical and optical-fiber cables not enclosed in raceways that are to be installed in plenums used to transport environmental air. To be judged acceptable under UL Standard 910, a cable must exhibit each of the following criteria when exposed to flame under certain conditions in a horizontal testing chamber: (a) the maximum flame-propagation distance is not to be greater than 5 ft, 0 in beyond the initial 4.5 ft test flame; (b) the peak optical density of the smoke produced is to be 0.50 or less (32% light transmission); and (c) the average optical density of the smoke produced is to be 0.15 or less.

The increase in voice, data, and video services has spurred the demand for higher fiber count cables for distribution runs within buildings. In addition, it is common to install higher fiber count cables to provide capacity for growth and network expansion. These demands have resulted in the need for superior fiber packing density in optical fiber cables. As ribbons have enhanced splicing efficiency and fiber packing density in high fiber count cables for the outside plant, similar requirements have evolved for indoor cable. In many situations, ribbon cables also offer enhanced splicing efficiency in the indoor plant; furthermore, when packaged in an appropriately flame retardant cable construction, the cables are suitable for plenum use.

A plenum cable is shown in U.S. Pat. No. 4,510,348. This cable includes a wrapping of inorganic cellular material which has a relatively low air permeability. In the embodiment shown in FIG. 4 thereof, this wrapping is disposed between a core tube holding a stack of optical fiber ribbons and a sheath system composed of two flame-retardant polyimide Kapton® tapes.

Another plenum cable is shown in U.S. Pat. No. 4,605,818. This cable includes a woven glass layer which is impregnated with a fluorocarbon resin and disposed between a core tube and an outer jacket formed of fluorinated resin plastic material. This cable is designed for a relatively small number of conductor pairs.

In the plenum cable described in U.S. Pat. No. 4,818,060, the inner tube and outer jacket each contain fluorinated materials. In contrast, the plenum cable described in U.S. Pat. No. 5,024,506 has both a core tube and jacket made of non-halogenated materials.

While the cable described in U.S. Pat. No. 4,941,729 includes a polyvinyl chloride jacket and a non-halogenated filled polyolefin, a metallic thermal barrier is interposed between the optical fibers and the jacket.

In addition to meeting the test criteria set out above, a cable must meet certain strength and other requirements to be suitable for installation using normal cable pulling techniques. One set of such requirements is set out in GR-409-CORE Issue 1, *Generic Requirements for Premises Fiber Optic Cable,* Bellcore, May 1994, referred to herein as GR-409-CORE and incorporated herein by reference.

An object of this invention is a relatively inexpensive cable having a central core tube design and being capable of containing a relatively large number of optical fibers in optical fiber ribbons, which cable also is capable of meeting industry standard criteria for plenum cables or other premises cables.

SUMMARY OF THE INVENTION

It is therefore an object of the present invention to provide a single-tube cable which is capable of meeting test criteria for premises cables and also criteria prescribed by UL Standard 910 and is therefore adapted for use in building plenums. Another object of the invention is to provide such a cable which uses an economical combination of materials.

These and other objects are provided, according to one embodiment of the present invention, by a flame-retardant, single-tube ribbon cable including 12-fiber ribbons containing multimode fibers, single-mode fibers, or both multimode fibers and single-mode fibers. This indoor cable may carry from 12 to 216 optical fibers. The inventive cable includes a core tube comprising a nonhalogenated polyolefin-based polymer material; a jacket formed of halogenated material surrounding the core tube, said jacket being formed of plastic material; and a plurality of dielectric strength members which are disposed between the core tube and the jacket. Despite not including metallic or flame-resistant tapes between the core tube and the jacket, the inventive cable meets all test criteria set out in UL Standard 910. The halogenated outer jacket contributes to cable flame retardance, while the nonhalogenated material of the core tube aids in limiting the generation of smoke.

BRIEF DESCRIPTION OF THE DRAWINGS

The preferred embodiments of the invention are described in the several drawings, in which.

DETAILED DESCRIPTION OF THE INVENTION

Figure 1:
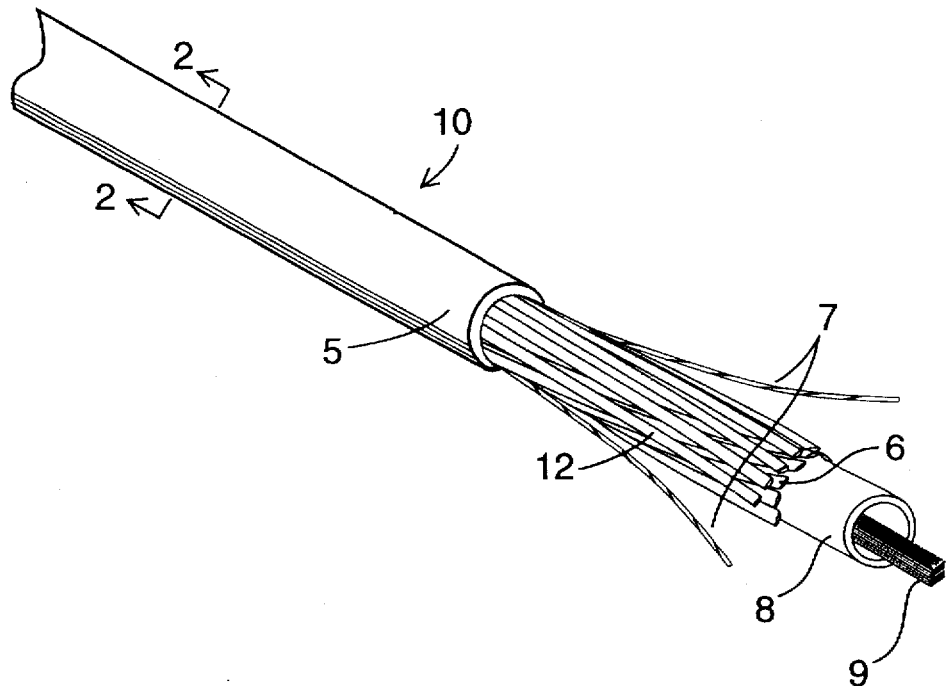
FIG. 1 is a perspective view of a cable according to the invention.

The present invention will be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

A single tube design requires tensile and anti-buckling components to be part of the jacket system. Proper selection of these elements, and of the tube and jacket materials, keeps elongation during cable installation from exceeding a predetermined value and keeps contraction and elongation due to temperature changes from exceeding predetermined values during the cable useful life. Mechanical requirements placed on the cable during installation dictate many of the design parameters.

For temperature cycling, the cable contraction and elongation can be estimated using known properties of the cabling materials to calculate a composite coefficient of thermal expansion. The coefficients of expansion for the plastics are at least an order of magnitude greater than that of the strength elements.

Several single tube design ribbon cables, each containing 216 optical fibers disposed in a stack of eighteen ribbons, were prepared in order to evaluate various combinations of core tube and jacket materials to determine what cables met the criteria of UL 910. Materials selected for testing included Union Carbide DEFA-1638 NT, a flame-retardant nonhalogenated polyethylene (PE) polyolefin polymer having a Limiting Oxygen Index (LOI) of 38%; a flame-retardant polyvinyl chloride (PVC) material having a LOI of 42%; a flame-retardant polyvinylidene fluoride (PVDF) material having a LOI of 70%; and Gary Corporation Smokeguard II 6960, a flame-retardant PVC material having a LOI of 52%. Both PVC materials and PVDF materials are halogenated by their nature. Test results are set out in Table 1 below.

TABLE 1

Test results of various material combinations as compared to criteria set out in UL 910

| Sample # | Core tube material and LOI | Jacket material and LOI | Flame spread, feet | Optical density (peak) | Optical density (average) |
|---|---|---|---|---|---|
| 1 | PE, 38 | PVC, 42 | 5.5 | 0.69 | 0.19 |
| 2 | PE, 38 | PVDF, 70 | 10.0 | 0.78 | 0.18 |
| 3 | PVC, 42 | PVC, 42 | 8.0 | 0.49 | 0.23 |
| 4 | PVC, 42 | PVDF, 70 | 6.0 | 0.79 | 0.20 |
| 5 | PVDF, 70 | PVC, 42 | 5.0 | 0.63 | 0.26 |
| 6 | PVDF, 70 | PVDF, 70 | 10.5 | 0.30 | 0.10 |
| 7 | PE, 38 | PVC, 52 | 4.0 | 0.26 | 0.07 |
| 8 | PE, 38 | PVC, 52 | 4.5 | 0.20 | 0.09 |
| UL 910 criteria, maximum | | | 5.0 | 0.50 | 0.15 |

Especially notable were the failures in Examples 2 and 4–6, in that the PVDF material tested has a very high LOI and is recommended for its characteristics of flame retardance and low smoke generation. The failure own for the non-inventive cable of Example 3 also was notable. Both PVDF and PVC are halogenated materials which have been used for many years in flame-retardant cables.

The results for Example 3 also were notable in that the PVC material used is a more highly flame retarded material than the PE material of Example 1.

The results of examples 1, 7, and 8 suggest that good results are achieved through the use of a combination of a nonhalogenated core tube material and a halogenated jacket material, especially PVC. The combination of materials selected for the cable of Example 1 might be suitable for a lower fiber count cable, but not for a cable containing over 96 optical fibers. By raising the LOI of the jacket material from 42 in Example 1 to 52 in Examples 7 and 8, the test criteria of UL 910 were achieved. It is believed that a PVC jacket material having a LOI of 46 also would be suitable. Example 2 appears to show that the PVDF material is not well suited for use in the cable jacket of the single-tube plenum cable application.

The inventive cable is designed to meet a 2700 N tensile load during installation and a long-term 600 N load as installed. The 216 optical fiber cable version has a jacket outer diameter of 16.9 mm and an average weight of 216 kg/km. The inventive cable also has good flexibility, having a specified minimum bend radius of 33.8 cm with the maximum specified tensile load during installation and a specified long term minimum bend radius of 16.9 cm. The inventive cable has a specified operating temperature of −20° C. to +50° C. and the NEC plenum rating OFNP.

Figure 2:
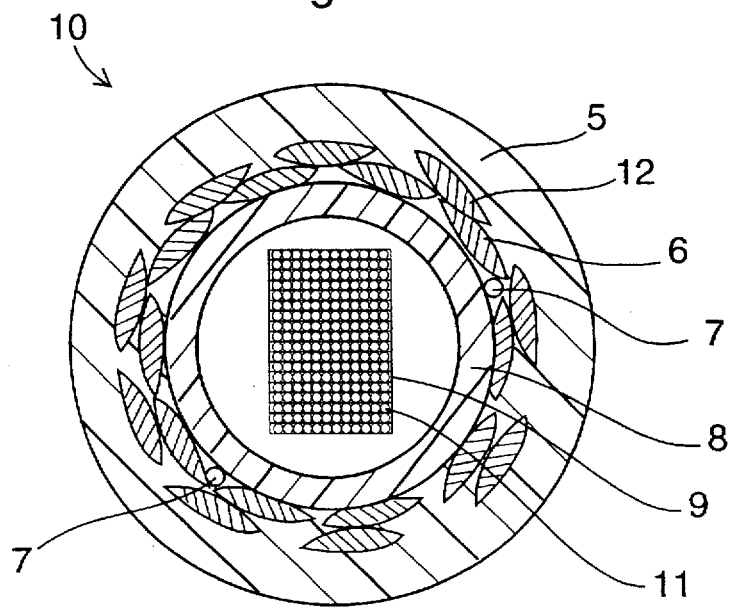
FIG. 2 is a cross-sectional view of the cable of FIG. 1.

Shown in FIGS. 1 and 2 is a cable 10 according to one embodiment of the invention. Core tube 8 encloses a stack of optical fiber ribbons 9 each having twelve optical fibers 11. In a particular design, as many as eighteen ribbons may be included in the stack, for a total capacity of 216 optical fibers. The cable is not water blocked, so air occupies the space within core tube 8 not occupied by the optical fiber ribbons. An inner layer 6 and an outer layer 12 of dielectric strength members surrounds the core tube 8. Two ripcords 7 underlie an outer jacket 5. The outer jacket 5 is pressure extruded over ripcords 7 and strength member layers 6 and 12.

The core contains a plurality of optical fibers 11. The optical fibers may be disposed singly or in the form of optical fiber ribbons 9 as shown. In a preferred embodiment, a stack of twelve-fiber optical fiber ribbons 9 is employed. The ribbon stack may be inserted with a twist having a pitch of 600 mm.

Core tube 8 is preferably formed of a flame-retardant polyolefin material. Examples of suitable polyolefins are polyethylene and polypropylene. One example of a suitable polyethylene material is Union Carbide DEFA-1638 NT, a non-halogenated flame-retardant polyethylene thermoplastic polymer designed for use in cables which must pass the IEEE-383 [UL 1581] Vertical Tray Cable Flame Test. This polyethylene material has a Limiting Oxygen Index (LOI) of 38% as measured by ASTM method D2863. In a preferred embodiment, a core tube 8 formed of the DEFA-1638 NT material is formed having an average outer diameter of 8.1 mm and an average wall thickness of 1.0 mm.

In order to meet test requirements, the percentage excess fiber or ribbon length must be controlled. Too little excess ribbon length causes hot bend test performance to suffer, while too much excess ribbon length causes cold bend test performance to suffer. In the preferred embodiment, excess ribbon length is about 0.05%, yielding acceptable test results.

A plurality of strength members surrounds core tube 8. In a preferred embodiment, inner layer 6 and an outer layer 12 of impregnated fiberglass yarn strands are disposed about core tube 8 stranded with opposite directions of lay. Owens-Corning CR-1700 impregnated fiberglass yarn strands may be employed in both inner strength member layer 6 and outer strength member layer 12. Ten yarn strands may be disposed in inner layer 6, with nine yarn strands in outer layer 12.

Outer jacket 5 is pressure extruded over strength member layers 6 and 12. The outer jacket material flows around and between at least the outermost layer of the impregnated fiberglass yarn strands, locking the strength members in place. This affords improved antibuckling characteristics and excellent low temperature performance. Two ripcords 7 may be partially embedded in outer jacket 5. Outer jacket 5 is formed of a halogenated material, which in the preferred embodiment is a polyvinyl chloride-based material. One example of a suitable polyvinyl chloride jacket material is Gary Corporation Smokeguard II 6960 material, which has a Limiting Oxygen Index of 52% as measured by ASTM method D-2863 and a Smoke generation value of 6% as measured by ASTM D-4100.

Selection of proper core tube and jacket materials is important. The flexural modulus of each material should be selected so the tube does not excessively flatten during high temperature bend testing or kink during low temperature bend testing. Bending of a softened core tube at high temperatures can impart severe stresses to the optical fibers, possibly causing attenuation and degrading their long term reliability. For these reasons, a tube material should be selected with a relatively high flexural modulus. In a preferred embodiment, the flexural modulus of the core tube is selected to be approximately 220 MPa, and the flexural modulus of the jacket is selected to be approximately 90 MPa.

Impact and compression test performance are related, and the performance during each test is a function of the flexural moduli of the materials chosen for the tube and jacket. Certain prior art cables incorporate stranded comparatively rigid glass-reinforced plastic rods in the jacket which function as strength elements. This construction forms a protective armor around the cable; however, it also makes cable entry and preparation difficult. In a preferred embodiment, a more flexible, stranded fiberglass yarn is incorporated into the jacket for strength. Advantex glass fiber CR 1700 cable reinforcement, provided by Owens Corning Corporation may be used. This yarn is impregnated with a styrene butadiene rubber, and has a modulus of elasticity of 65.5 GPa and a coating percent loss on ignition of 10%. By utilizing this yarn, the required tensile strength and anti-buckling strength is achieved while still providing the craftsperson with easy access to the ribbons.

A 96 fiber inventive cable containing single-mode fibers and a 216 fiber inventive cable containing single-mode fibers each were tested against test criteria established in GR-409-CORE, except that, due to the large outer diameters of the cables, a mandrel having an outer diameter of 254 mm was used in high and low temperature bend testing at temperatures of −20° C. to +50° C. The outer diameter of the 96 fiber cable was 13.5 mm and the outer diameter of the 216 fiber cable was 16.7 mm. Each cable employed 12-fiber ribbons. When attenuation change was being monitored, edge fibers from the two outermost ribbons and two middle ribbons in the stack were tested for each cable, because these fibers typically include those fibers which are most susceptible to attenuation change. Temperature cycling was conducted at temperature extremes of −20° C. to +70° C. Compressive strength testing was conducted at a load of 10 N/mm, and impact resistance testing was conducted using an impact energy of 2.94 Newtons times meters. Results of the tests indicated are set out in Table 2 below.

TABLE 2

Maximum attenuation change from Low and High Temperature Cable Bend, Impact Resistance, Compressive Strength, and Temperature Cycling testing

| Test | Maximum change in attenuation |
| --- | --- |
| Low Temperature Cable Bend, 96f (254 mm mandrel) | 0.095 dB |
| Low Temperature Cable Bend, 216f (254 mm mandrel) | 0.007 dB |
| High Temperature Cable Bend, 96f (254 mm mandel) | 0.087 dB |
| High Temperature Cable Bend, 216f (254 mm mandrel) | 0.110 dB |
| Impact Resistance, 96f | 0.000 dB |
| Impact Resistance, 216f | 0.005 dB |
| Compressive Strength, 96f | 0.031 dB |
| Compressive Strength, 216f | 0.065 dB |
| Temperature Cycling, 96f | 0.070 dB/km |
| Temperature Cycling, 216f | 0.065 dB/km |

It is to be understood that the invention is not limited to the exact details of the construction, operation, exact materials, or embodiments shown and described, as modifications and equivalents will be apparent to one skilled in the art without departing from the scope of the invention.

What is claimed is:

1. An optical fiber cable, comprising:
   a core comprising at least one optical fiber;
   a core tube surrounding said core, said core tube comprising a non-halogenated polyolefin-based polymer material;
   a jacket surrounding said core tube, said jacket being formed of chlorinated plastic material; and,
   a plurality of dielectric strength members which are disposed between said core tube and said jacket, said cable having a maximum flame propagation of 5.0 feet or less, a peak optical density of 0.50 or less, and an average optical density of 0.15 or less, and each said optical fiber having a maximum change in attenuation of 0.20 dB or less when placed on a mandrel having a diameter of 254 mm at temperatures of −20° C. and +50° C., subjected to impact energy of 2.94 N m, subjected to a compressive load of 10 N/mm, or exposed to temperatures of −20° C. to +70° C.

2. A cable as set out in claim 1, wherein said nonhalogenated polyolefinbased polymer material comprises polyethylene material.

3. A cable as set out in claim 1, wherein said nonhalogenated polyolefinbased polymer material comprises polypropylene material.

4. A cable as set out in claim 1, wherein said chlorinated material comprises polyvinyl chloride.

5. A cable as set out in claim 1, wherein said jacket material has a limiting oxygen index of at least 46.

6. A cable as set out in claim 1, wherein said cable contains only nonmetallic materials.

7. A cable as set out in claim 1, wherein said jacket is pressure extruded.

8. An optical fiber cable, comprising:
   a core comprising at least one optical fiber;
   a core tube surrounding said core, said core tube comprising a nonhalogenated polyolefin-based polymer material;

a jacket surrounding said core tube, said jacket being formed of chlorinated plastic material; and, a plurality of dielectric strength members which are disposed between said core tube and said jacket in the absence of any flame-retardant tape, said cable having a maximum flame propagation of 5.0 feet or less, a peak optical density of 0.50 or less, and an average optical density of 0.15 or less.

9. A cable as set out in claim 8, wherein said nonhalogenated polyolefin-based polymer material comprises polyethylene material.

10. A cable as set out in claim 8, wherein said nonhalogenated polyolefin-based polymer material comprises polypropylene material.

11. A cable as set out in claim 8, wherein said chlorinated material comprises polyvinyl chloride.

12. A cable as set out in claim 8, wherein said jacket material has a limiting oxygen index of at least 46.

13. A cable as set out in claim 8, wherein said cable contains only nonmetallic materials.

14. A cable as set out in claim 8, each said optical fiber having a maximum change in attenuation of 0.20 dB or less when placed on a mandrel having a diameter of 254 mm at temperatures of $-20°$ C. and $+50°$ C., subjected to impact energy of 2.94 N m, subjected to a compressive load of 10 N/mm, or exposed to temperatures of $-20°$ C. to $+70°$ C.

15. An optical fiber cable, comprising:

a core comprising at least one optical fiber ribbon;

a core tube surrounding said core, said core tube comprising a nonhalogenated polyolefin-based polymer material;

a jacket surrounding said core tube, said jacket being formed of chlorinated plastic material; and, a plurality of dielectric strength members which are disposed between said core tube and said jacket, said cable having a maximum flame propagation of 5.0 feet or less, a peak optical density of 0.50 or less, and an average optical density of 0.15 or less, and each said optical fiber having a maximum change in attenuation of 0.20 dB or less when placed on a mandrel having a diameter of 254 mm at temperatures of $-20°$ C. and $+50°$ C., subjected to impact energy of 2.94 N m, subjected to a compressive load of 10 N/mm, or exposed to temperatures of $-20°$ C. to $+70°$ C.

16. A cable as set out in claim 15, wherein said jacket material has a limiting oxygen index of at least 46.

17. A cable as set out in claim 15, wherein said cable contains only nonmetallic materials.

18. An optical fiber cable, comprising:

a core comprising at least one optical fiber ribbon;

a core tube surrounding said core, said core tube comprising a nonhalogenated polyolefin-based polymer material;

a jacket surrounding said core tube, said jacket being formed of chlorinated plastic material; and, a plurality of dielectric strength members which are disposed between said core tube and said jacket in the absence of any flame-retardant tape, said cable having a maximum flame propagation of 5.0 feet or less, a peak optical density of 0.50 or less, and an average optical density of 0.15 or less.

19. A cable as set out in claim 18, wherein said jacket material has a limiting oxygen index of at least 46.

20. A cable as set out in claim 18, wherein said cable contains only nonmetallic materials.

* * * * *